(12) United States Patent
Probst et al.

(10) Patent No.: US 9,848,705 B2
(45) Date of Patent: Dec. 26, 2017

(54) ELECTRICALLY ADJUSTABLE OFFICE CHAIR

(71) Applicant: Stabilus GmbH, Koblenz (DE)

(72) Inventors: Ulrich Probst, Koblenz (DE); Lars Löhken, Koblenz (DE); Raphael Piroth, Koblenz (DE); Markus Müller, Koblenz (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 15/219,754

(22) Filed: Jul. 26, 2016

(65) Prior Publication Data

US 2017/0027323 A1 Feb. 2, 2017

(30) Foreign Application Priority Data

Jul. 28, 2015 (DE) ........................ 10 2015 214 297

(51) Int. Cl.
| | |
|---|---|
| *A47C 1/024* | (2006.01) |
| *A47C 3/20* | (2006.01) |
| *A47C 7/00* | (2006.01) |
| *A47C 7/14* | (2006.01) |
| *A47C 7/40* | (2006.01) |
| *A47C 7/46* | (2006.01) |
| *A47C 7/54* | (2006.01) |
| *A47C 7/60* | (2006.01) |
| *F16H 19/00* | (2006.01) |
| *F16H 25/20* | (2006.01) |
| *A47C 1/025* | (2006.01) |
| *A47C 1/032* | (2006.01) |

(52) U.S. Cl.
CPC ............ *A47C 1/0242* (2013.01); *A47C 1/025* (2013.01); *A47C 1/03211* (2013.01); *A47C 1/03233* (2013.01); *A47C 1/03255* (2013.01); *A47C 3/20* (2013.01); *A47C 7/006* (2013.01); *A47C 7/14* (2013.01); *A47C 7/402* (2013.01); *A47C 7/462* (2013.01); *A47C 7/54* (2013.01); *A47C 7/60* (2013.01); *F16H 19/001* (2013.01); *F16H 25/20* (2013.01); *F16H 2019/008* (2013.01)

(58) Field of Classification Search
CPC ... A47C 1/0242; A47C 1/025; A47C 1/03211; A47C 1/03233; A47C 1/03255; A47C 3/20; A47C 7/006; A47C 7/14; A47C 7/402; A47C 7/462; A47C 7/54; A47C 7/60; F16H 19/001; F16H 25/20
USPC ................................................ 297/217.3, 330
See application file for complete search history.

(56) References Cited

U.S. PATENT DOCUMENTS

| | | | | |
|---|---|---|---|---|
| 4,944,554 | A | * | 7/1990 | Gross ................ A47C 7/462 297/284.11 |
| 5,556,163 | A | * | 9/1996 | Rogers, III ............ A47C 1/023 297/330 X |
| 6,629,731 | B2 | * | 10/2003 | Rogers ................. A47C 1/023 297/330 |

* cited by examiner

*Primary Examiner* — Anthony D Barfield
(74) *Attorney, Agent, or Firm* — Rankin, Hill & Clark LLP

(57) ABSTRACT

An office chair including a base, a seat, a chair column that extends in the vertical direction between the base and the seat, and a backrest, further comprising an electric drive unit that comprises an electric motor and a change gear, the change gear being designed to input the rotational force of the electric motor into a first adjustment device for adjusting a seat height of the seat and converting said force in a second adjustment device for adjusting a tilt of the seat or the backrest.

16 Claims, 6 Drawing Sheets

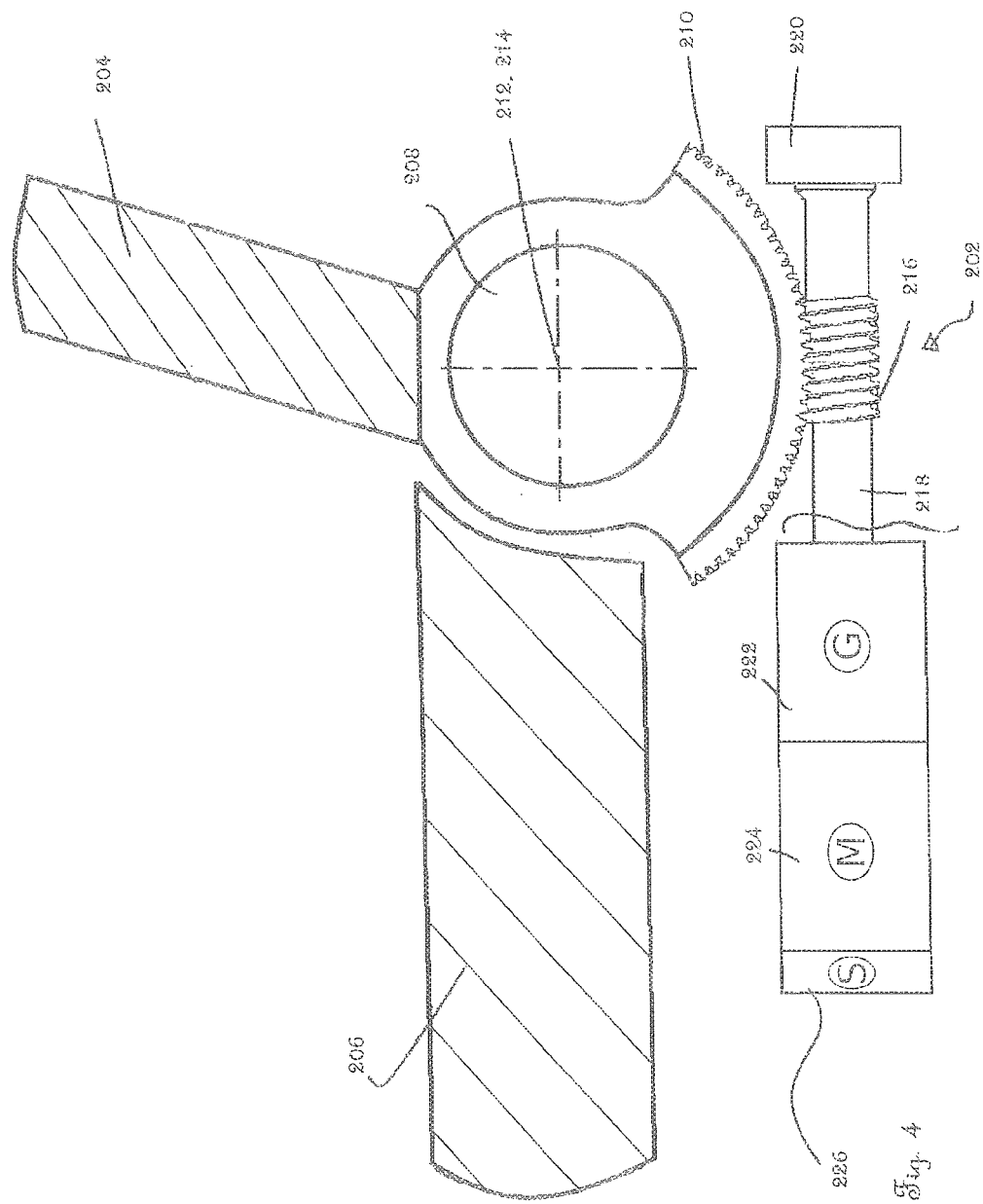

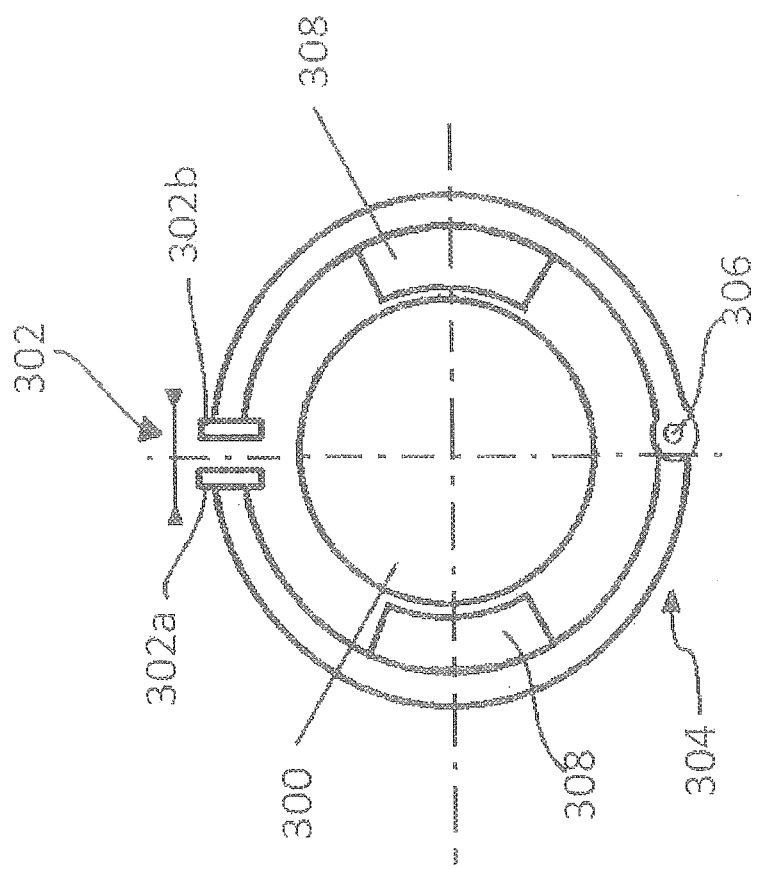
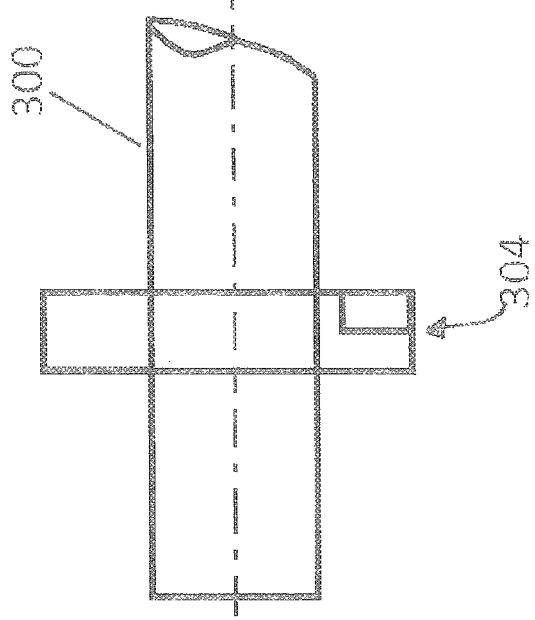
Fig 5a
Fig 5b

ELECTRICALLY ADJUSTABLE OFFICE CHAIR

The present invention relates to an electrically adjustable office chair comprising an electric drive unit, and to an electric drive unit.

In order to make it comfortable to work during a seated activity, it is important to adjust an office chair for a healthy posture. For this purpose, in particular a seat height, a tilt of a seat surface, a backrest position relative to the seat surface, and a tilt of an office chair back are adjusted. However, these adjustments are predominantly made by means of latching or clamping mechanisms or against the force of a biased spring or a pressurised cylinder, which means that the adjustments often cannot be made in a sufficiently precise manner. Likewise, the backrest and/or the seat surface may also be able to move up and down against a biased spring/pneumatic spring, but the spring constants cannot be matched to the requirements of the user. Moreover, the operating elements of the seat adjustment are arranged close to the mechanics, as a result of which they are frequently difficult for a seated person to access.

The object of the present invention is therefore that of providing an office chair which can be adjusted in a comfortable and precise manner and is preferably cost-effective to produce. It is also an object of the present invention to provide means for achieving the first object.

According to a first aspect of the invention, the object is achieved by an office chair comprising a base, a seat, a chair column that extends in the vertical direction between the base and the seat, and a backrest, and further comprising an electric drive unit that comprises an electric motor and a change gear, the change gear being designed to input the rotational force of the electric motor into a first adjustment device for adjusting a seat height of the seat and converting said force in a second adjustment device for adjusting a tilt of the seat or the backrest. The office chair can be adjusted in a particularly comfortable and precise manner, since electrical operating elements are not coupled to the positioning of the drive mechanism, and an electric drive can be adjusted more precisely than a latching/clamping mechanism.

A drive-free actuation unit can be understood as being a mechanism for changing a position of an office chair element (seat, back, armrest, etc.), an orientation of an office chair element (tilt of a seat, of a back, of an armrest, etc.), or for changing a bias of a spring by compressing or relieving said spring (e.g. by means of a spindle drive).

It can be envisaged for the change gear to comprise a drive input that is connected to the electric motor, and at least two rotary drive outputs, a first rotary drive output driving the first adjustment device and a second rotary drive output driving the second adjustment device. As a result, one single electric motor can drive two adjustment devices, thus reducing the production costs.

It is furthermore possible for the change gear to comprise a transmission shaft that can be moved between at least two transmission positions, the transmission shaft coupling the drive input to one of the two rotary drive outputs in a first transmission position, and coupling the drive input to the other of the two rotary drive outputs in a second transmission position. A movable transmission shaft is a particularly simple and reliable switchable force transmission element between the drive input and the particular rotary drive output.

The electric drive unit is preferably arranged under a seat surface of the seat, preferably inside a seat lower shell. As a result, the electric drive unit can be arranged in a spacious region of the office chair, and therefore large and powerful electric drive units can also be used.

If it is envisaged to arrange the electric motor, and preferably also the change gear, in the seat column, the seat height adjustment can thus be driven as directly as possible and without unnecessary friction losses.

The office chair preferably comprises at least one further adjustment device for adjusting at least one further parameter, the parameter being selected from: backrest height, seat tilt, backrest tilt, armrest tilt, seat shape and backrest shape. This allows particularly comfortable adjustment of the office chair. In particular, a bias of an element (spring/pneumatic spring) cushioning a backrest, a seat or an armrest can be adjusted as a parameter by an adjustment device.

According to a second aspect of the invention, an electric drive unit is provided, preferably for use in an office chair according to the first aspect of the invention, comprising an electric motor and a change gear having a drive input that is connected to the electric motor, and at least two rotary drive outputs, the change gear comprising a transmission shaft that can be moved between at least two transmission positions, the transmission shaft coupling the drive input to one of the two rotary drive outputs in a first transmission position, and coupling the drive input to the other of the two rotary drive outputs in a second transmission position.

A cost-effective and precisely adjustable electric drive unit can thus be provided.

It is further possible for the transmission shaft to be moved relative to at least one of the rotary drive outputs by means of a pivot movement and/or a translation during a transition between the first transmission position and the second transmission position. The change gear can thus be compact, meaning that it can be integrated without costly changes into elements of the office chair having corresponding dimensions.

During a transition between the first transmission position and the second transmission position, the transmission shaft can be moved, at least in portions, substantially in the axial direction of the transmission shaft or in a direction transverse to the axis of the transmission shaft. This makes it possible to match the construction of the change gear to the spatial conditions of the installation site in the office chair.

Likewise, during a transition between the first transmission position and the second transmission position, the transmission shaft can be moved, together with the electric motor, relative to at least one of the rotary drive outputs. As a result, a cost-effective and reliable connection between the drive unit and the transmission shaft can be provided.

It is further envisaged for the transmission shaft to form the motor shaft of the electric motor or to be attached coaxially and for conjoint rotation to the motor shaft of the electric motor. This allows a particularly simple connection between the motor shaft and the transmission shaft.

In a preferred embodiment, each of the rotary drive outputs can be exclusively driven, in each case, by the electric motor. This makes it possible for the electric drive unit to drive a plurality of outputs independently of one another.

Furthermore, at least two drive shafts of the rotary drive outputs can be arranged coaxially. This makes it possible to construct the electric drive unit so as to be particularly small in a dimension transverse to the coaxial drive shafts, as a result of which said unit can be installed in an elongate element such as a chair column.

In this case, the change gear can comprise two couplings which preferably each engage on one end, respectively, of the transmission shaft, the transmission shaft being offset relative to at least one of the rotary drive outputs by means of a translation substantially along the transmission shaft during a transition between the first transmission position and the second transmission position, and one of the couplings being coupled and the other of the couplings being decoupled during this transition. This makes it possible to drive rotary drive outputs in a particularly reliable manner.

It is likewise envisaged to arrange at least two drive shafts of the rotary drive outputs so as to be offset, preferably offset in parallel and/or tilted relative to one another. This makes it possible to construct the electric drive unit so as to be particularly small in a dimension in the longitudinal extension direction, as a result of which said unit can be installed in planar elements such as a piece of furniture.

In this case, the change gear can further comprise a worm arranged on the transmission shaft and at least two worm wheels arranged on the output side, the worm being designed to drive, preferably exclusively, one of the worm wheels in the first transmission position, and to drive, preferably exclusively, another of the worm wheels in the second transmission position. As a result, a particularly high force can be transmitted to the worm wheels, each of which wheels is preferably coupled to a rotary output.

It is further envisaged for the electric drive unit to further comprise at least one brake mechanism, the brake mechanism blocking a movement of the other worm wheel when one of the worm wheels is driven, in at least one of the first and second transmission positions of the transmission shaft. This makes it possible to provide locking for mechanisms that are connected to the worm wheels and that are not self-locking.

It is noted that the first aspect of the invention can be combined with elements of the second aspect, and also that elements of electric drive units of the first aspect can be used in electric drive units of the second aspect of the invention.

The invention will be described in the following on the basis of embodiments and associated drawings of the invention. In the drawings:

FIG. 4 is a sketch of a tilt adjustment;

FIGS. 5a and 5b are sketches of views of a brake;

The present invention will be described in the following using the example of chairs. However, it should be noted that the electric drive units are not restricted to this embodiment, but rather are an independent inventive concept.

FIRST EMBODIMENT

Figure 1:
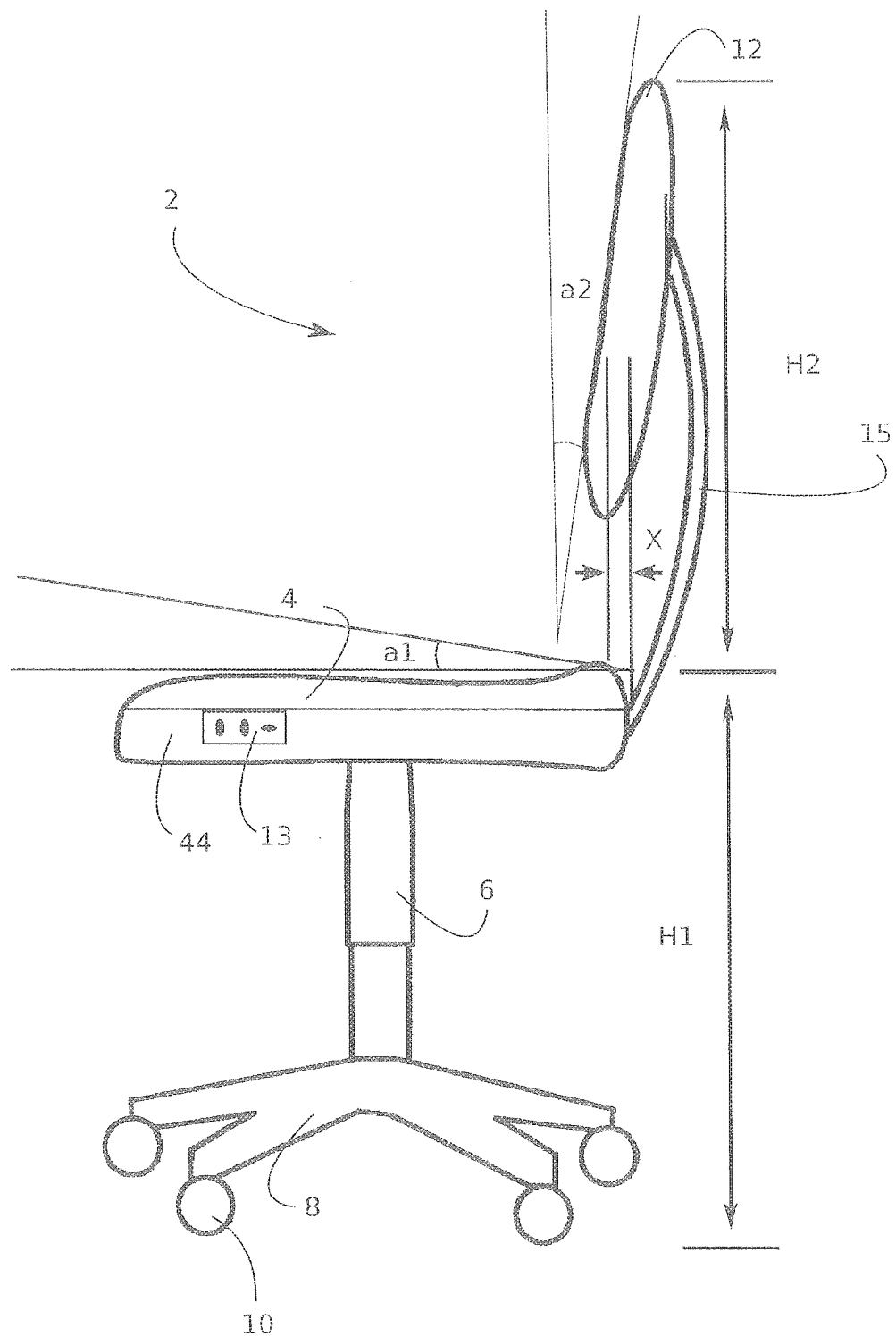
FIG. 1 is a sketch of a chair according to an embodiment of the present invention.

FIG. 1 shows an office chair 2 according to the first aspect of the invention. The office chair 2 comprises a base 8, a seat 4 having a seat surface, a chair column 6 that extends in the vertical direction between the base 8 and the seat 4, and a backrest 12. The office chair 2 can also comprise at least one armrest (not shown). Casters 10 can be arranged on the base 8.

The office chair 2 can also comprise at least one armrest (not shown). The office chair 2 can be adjustable with respect to a plurality of parameters; for example the seat height H1 can be changed by changing the length of the chair column 6. Moreover, a tilt of the seat surface of the seat 4 (indicated by the tilt angle a1—seat tilt) can be adjusted. It is further preferable for the height H2 (backrest height) of the backrest 12 to be adjustable relative to the seat 4 and/or to the distance X thereof substantially along the seat surface of the seat 4. It is furthermore particularly preferable for a tilt (backrest tilt) of the backrest 12 (indicated by the tilt angle a2) to be adjustable.

Spindle drives, for example, can be used to adjust the heights H1, H2 and the distance X. Said drives can be arranged in the chair column 6 for changing H1, in parallel with the seat surface for changing X, or in a back support 15 for changing H2. Worm gears can be used for adjusting the tilt angles a1, a2. In this case, a worm wheel or the segment thereof is preferably arranged on the pivot shaft, on which the seat surface of the seat 4 or the backrest 12 pivots, with the result that the gearing is self-locking in the sense that a tilting load of the backrest 12 or the seat surface of the seat 4 does not result in a change in the tilt of this element. Likewise, racks or rigid chains can be used.

The armrests (not shown) can also preferably be adjusted in terms of the height thereof relative to the seat surface of the seat 4 and/or the tilt thereof (armrest tilt). It is further possible to adjust a seat shape and/or backrest shape of the office chair 2, for example by displacing and/or rotating upholstery elements inside the seat 4 or the backrest 12 relative to one another.

The office chair 2 further comprises an electric drive unit that comprises an electric motor 18 and a change gear 14, the change gear being designed to input the rotational force of the electric motor 18 into a first adjustment device for adjusting a seat height of the seat 4, and to convert said force in a second adjustment device for adjusting a tilt of the seat 4 or the backrest 12.

The adjustment device for adjusting a seat height of the seat 4 can be a spindle arrangement that is arranged in the chair column.

Within the context of this application, an adjustment device is to be understood as a mechanical arrangement that does not comprise an electric, pneumatic or hydraulic drive but that is designed to convert a rotational force of an electric motor into an adjustment of an element, such as a height adjustment of the seat 4, an adjustment of the tilt a1 thereof, an adjustment of a spring bias, etc.

The adjustment devices can be connected to the electric drive unit by means of a force transmission mechanism that can comprise rods, chains, bevel gears (e.g. for providing a 90° angle in the force transmission), tumble gearing or hypoid drives. Force transmission mechanisms of this kind can be coupled to rotary drive outputs 20a, 20b of the electric drive unit such that the electric drive unit can drive the individual adjustment devices.

It is possible to design the force transmission mechanism so as to be hydraulic or pneumatic, a pump then being able to couple to one of the rotary drive outputs 20a, 20b of the electric drive unit and the pump being able to be connected via a pressure connection to an adjustment device designed as a cylinder.

The concept mentioned above makes it possible to provide one, in particular one single, electric motor in the electric drive unit, which motor is used to drive at least two, preferably all, adjustment devices, leading to savings in cost and weight. It is also possible to activate the electric drive unit by means of an operating element 13 attached to the office chair, a remote control, or a program, it being possible for corresponding activation and/or receiver elements that are known to a person skilled in the art to be provided on the electric drive unit. As a result, the operating elements can be arranged so as to be easily accessible, and only a little force is needed for the use thereof. Height and tilt positions of office chair elements can be achieved without any physical action by a user, apart from pressing a button. If the electric drive unit is appropriately designed, this can occur while the user is sitting on the office chair, and therefore an optimal seat position can be set.

Adjustment devices can comprise an adjustment measuring device, e.g. for measuring a lift, an angular position or a similar variable, with the result that a desired position or a plurality of desired current positions of an adjustment device can be stored in an electronic module, the same being true for a plurality of adjustment devices or for all the adjustment devices.

The appropriate positions can be approached by means of the electric drive unit, using a control arrangement that is conventional for a person skilled in the art and on the basis of the stored positions and the corresponding output(s) of the adjustment measuring device(s). In particular, it is possible to store approached positions of adjustment devices that correspond to a seat height and/or a back tilt.

Electrical energy can be supplied to the electric drive unit by means of a battery, an accumulator or a cable.

A principle of an adjustment device 202 for adjusting a tilt of the seat 4 or the backrest 12 is shown in FIG. 4 on the basis of a tilt adjustment 200 of a tilt of a backrest 204, the elements 222 to 224 not belonging to the adjustment device. In this embodiment, a backrest 204 can be tilted relative to a seat surface 206. The backrest 204 can in particular be pivoted relative to the seat surface 206 on a pivot shaft 208. A worm wheel segment 210 is preferably arranged, preferably in a non-rotational manner, on the backrest 204, such that a pivot point 212 of the backrest 204 and the centre of rotation 214 of the worm wheel segment 210 coincide. It can be envisaged to drive the worm wheel segment 210 by means of a worm 216 that can be arranged on a shaft 218. The shaft 218 can be borne by a bearing 220 in the adjustment device 202. The shaft 218 can be connected by means of a bevel gear to an electric drive unit arranged in the chair column 6 for example. However, it is also possible, as shown in FIG. 4, in particular if a tilt of the seat surface is achieved by the electric drive unit, to provide a separate gearing 222 together with a separate electric motor 224 and a motor control 226 for driving the shaft 218.

The electric drive unit according to the second aspect of the invention will be discussed in the following, which unit is provided in the office chair 2 described above.

The electric drive unit comprises a change gear 14, a drive input 16 and an electric motor 18 that is connected to the drive input 16. The change gear 14 can further comprise two rotary drive outputs that are each designed as respective output shafts 20*l*, 20*r*, one of which can drive the adjustment device for adjusting a seat height of the seat 4, and the other of which can drive the adjustment device for adjusting a tilt of the seat 4 or the backrest 12 in the office chair 2.

Figure 2:
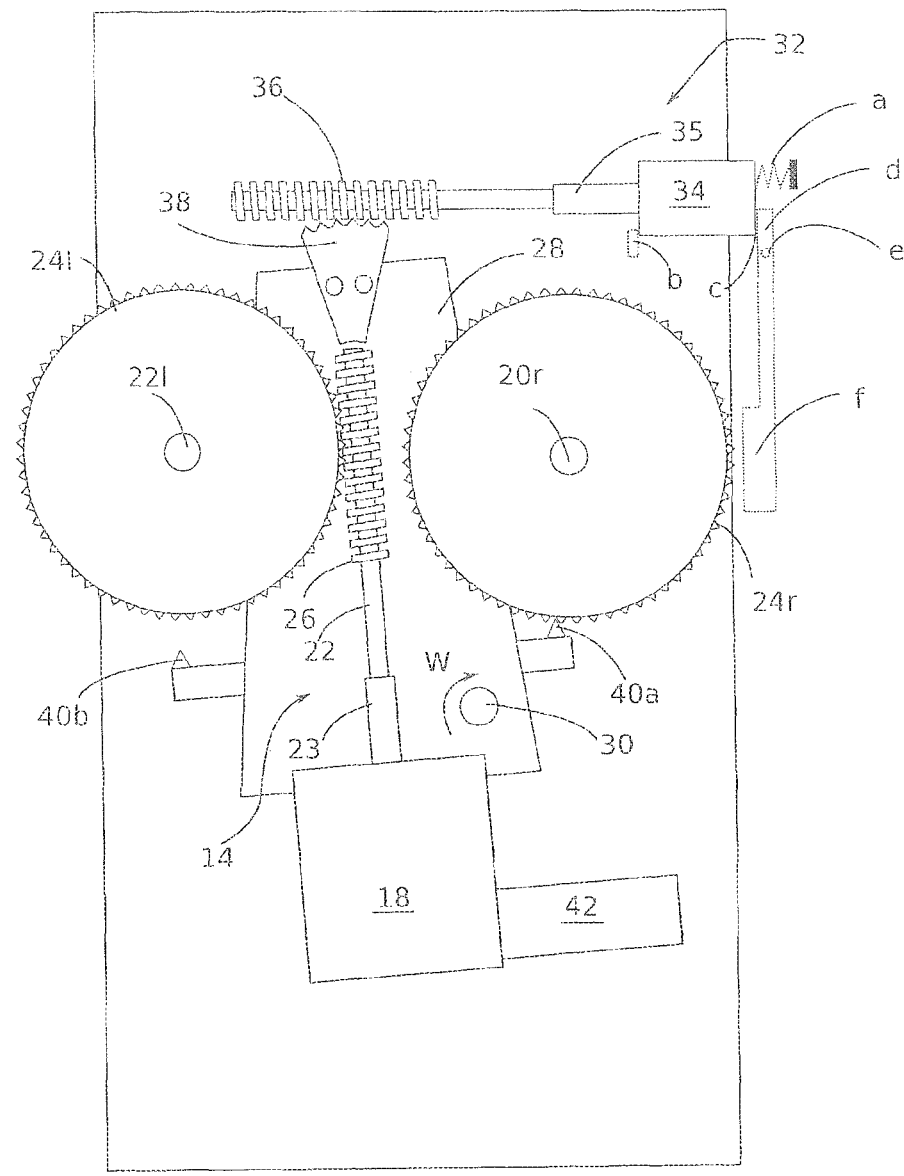
FIG. 2 is a sketch of an electric drive unit according to an embodiment of the present invention.

The change gear 14 can comprise a transmission shaft 22 that couples the drive input 16 to the output shaft 20*l* in the first transmission position shown in FIG. 2, preferably by means of a worm wheel 24*l* and a worm 26 arranged on the transmission shaft 22. The electric motor 18 can be arranged on an offset carrier 28 that can pivot about a rotary shaft 30.

The transmission shaft 22 can form the motor shaft 23 of the electric motor 18 or can be attached coaxially and for conjoint rotation to the motor shaft 23 of the electric motor 18.

In order to reach a second transmission position (not shown) of the transmission shaft 22, in which the drive input 16 couples to the output shaft 20*r*, the offset carrier 28 can pivot about the rotary shaft 30 in the direction W. The worm 26 can then engage on the second worm wheel 24*r*. In this case, the transmission shaft 22 is moved, together with the electric motor 18, during a transition between the first and the second transmission position, the transmission shaft 22 being moved substantially transversely to the extension thereof, or rather the shaft thereof, by means of a pivot movement during this transition. This movement occurs relative to the two output shafts 20*l*, 20*r*. By a rotation counter to the direction W, the transmission shaft 22 again reaches the first transmission position. The individual output shafts 20*l*, 20*r* can therefore be driven exclusively, i.e. in each case only individually and independently of one another, in the individual transmission positions.

The output shaft 20*l* is preferably connected for conjoint rotation to the worm wheel 24*l*, and the rotary drive shaft 20*r* is preferably connected for conjoint rotation to the worm wheel 20*r*.

The transition between the electric motor 18 and the transmission shaft 22 can be considered to be the drive input 16 of the change gear 14. The worm 26 is preferably arranged, together with the transmission shaft 22, on an offset carrier 28. The offset carrier 28 can be pivoted about the rotary shaft 30 by means of an offset mechanism 32.

It is also possible not to pivot the offset carrier but rather to subject said carrier to a translation, for example guided along rails, with the result that the worm is in contact with either one worm wheel or the other worm wheel, and thus exclusively drives each worm wheel, respectively.

The worm wheels 24*l*, 24*r* can be arranged substantially in the offset plane of the worm 26. Said wheels can, however, also be arranged substantially perpendicularly thereto, in particular the planes of rotation of the worm wheels can intersect in an axis of rotation of a pivot movement of the offset carrier, and the worm, the longitudinal axis of which preferably extends through said axis of rotation, can then be moved between the two worm wheels by means of a pivot movement for the purpose of coupling. In this embodiment (not shown), the shafts of the worm wheels are tilted at an angle relative to one another and are thus also arranged offset from one another.

In the embodiment shown in FIG. 2, the output shafts 20*l*, 20*r* are preferably arranged so as to be offset in parallel to one another.

The offset mechanism 32 preferably comprises a further electric motor 34 that drives a positioning worm 36 of a worm gear, it being possible for the corresponding worm wheel 38, or just a segment thereof, to be formed so as to be connected for conjoint rotation to the offset carrier 28 or even so as to be integral therewith. Since, in most cases, the pivot movement of the offset carrier 28 has only a small angular range, the segment of the worm wheel 38 can be replaced by a rack as long as sufficient tolerances are provided when the teeth engage in the positioning worm 36. A drive of this kind can also be used for a translational offset of the offset carrier 28 when there is a suitable guide (see above). If the offset carrier is to carry out a more complicated movement, for example a combination of a pivot movement and a translational movement, this can be achieved by means of a corresponding superimposition of a translational drive or a pivot drive.

Providing the worm gear in the offset mechanism 32 means that the offset mechanism 32 can also maintain the position of the offset carrier 28 without a current.

The position of the offset carrier 28 is preferably monitored by a position sensor, meaning that a control unit (not shown) can control the approach of the offset mechanism 32 to the first and/or second transmission position.

In addition to the first and/or second transmission position, the offset mechanism 32 can approach a neutral position (see FIG. 6) of the transmission shaft 22 lying therebetween, in which position the worm 26 arranged on the transmission shaft 22 does not engage in any of the worm wheels 24l, 24r. For approaching the neutral position, it is particularly preferable to provide the above-mentioned position sensor, optionally in conjunction with a control unit.

A first brake 40a is preferably provided on the offset carrier 28, which brake is designed to block the second worm wheel 24r in the first transmission position, for example. This can be achieved by a configuration that engages in the pinions of the worm wheel 24r. A corresponding second brake 40b is shown in FIG. 2, which brake is designed to prevent a rotation of the first worm wheel 24l in the second transmission position. The position of the second brake 40b relative to the offset carrier 28 is only indicated, and can be determined by a person skilled in the art by means of trial and error.

However, the provision of brakes of this kind can be omitted. Furthermore, the brakes can also function as end stops for the offset movement of the offset carrier 28. However, if just one single brake is provided, a stop 42 can also be provided in order to limit the offset of the offset carrier, in this case by means of the stop on the electric motor 18 that is rigidly connected to the offset carrier 28.

Brakes of the kind such as 40a, 40b can in particular be omitted if the electric drive unit engages on adjustment devices that are self-locking in the sense that a change in the adjustment of an element of the office chair is possible not by means of a force being exerted on the element itself but rather only by inputting a drive force into the adjustment device.

The electric drive unit described above is designed to be planar such that it has a small height (dimension out of the plane of projection). It is therefore particularly suitable for being arranged under a surface of an office chair, for example the seat surface 4. This means in particular the space between the seat surface and the seat lower shell 44 of the office chair 2, and therefore an arrangement inside the seat lower shell 44. In this case, in particular the rotary drive output shaft 20r can be used for driving a spindle arrangement or a spindle drive that is preferably arranged inside the seat column 6, by means of which the seat height of the seat surface can be adjusted. The second rotary drive output shaft 20r can be used, for example in conjunction with a bevel gear and/or a worm gear, to change the tilt angle of the seat surface or the backrest 12.

Alternatively to the above-mentioned brakes 40a, 40b that can come into engagement with worm wheels by means of a toothing, a brake can be formed in that a shaft 300 to be braked is provided with a clamp 304 provided with an electromagnet 302, which clamp can comprise a hinge 306 in addition to the electromagnet 302. Furthermore, at least one brake pad 308, preferably a plurality of brake pads 308, is/are preferably provided on the inside of said clamp 304 that in particular cannot co-rotate with the shaft 300. Depending on whether or not the brakes are intended to brake in a currentless state, the brake can be biased on the hinge 306 by means of a spring or another load element such that a brake pad 308 engages on the shaft 300 when a braking effect is desired in the currentless state of the electromagnet 302, or such that none of the brake pads 308 engages on the shaft 300 when the electromagnet 302 is currentless.

In the first case mentioned, coils 302a, 302b of the electromagnet 300 can be designed so as to repel one another when a current is applied, and in the second case mentioned the coils 302a, 302b of the electromagnet 302 can be designed so as to attract one another when a current is applied.

In this way, a brake can be provided that either brakes in the currentless state and does not brake in the energised state, or alternatively that does not brake in the currentless state and brakes in the energised state.

In addition, a further possible braking arrangement is shown by a dashed line in FIG. 2. In this case, the electric motor 34 can be mounted so as to be displaceable in the axial direction of the output shaft 35 thereof and can be biased against a stop b by means of a relatively strong spring a. During normal rotation of the change motor 34 in both directions in order to move the transmission shaft 22, the change motor 34 preferably always remains in contact with the stop b. When the first and/or second transmission position is reached, the change motor 34 can be automatically switched off by means of limiting the motor current. However, if rotation continues at an increased motor current in the switching state of the change motor 34 shown in the drawing, for example by means of pressing a braking button or on account of a predetermined operating mode, the positioning worm 36 thus displaces the change motor 34 across the motor shaft 35 away from the stop b, against the force of the spring a. The change motor 34 then moves a brake lever d across means of the stop c, which brake lever can be rotatably mounted at e. A brake element f is preferably provided on the brake lever d, which brake element then comes into contact with the worm wheel 24r and can brake said worm wheel, preferably by means of a brake pad or a brake toothing. It should be noted that, due to the design of the worm gear 36, 38, this brake position remains in the braking state without it being necessary to supply electrical power to the offset mechanism 32.

Figure 6:
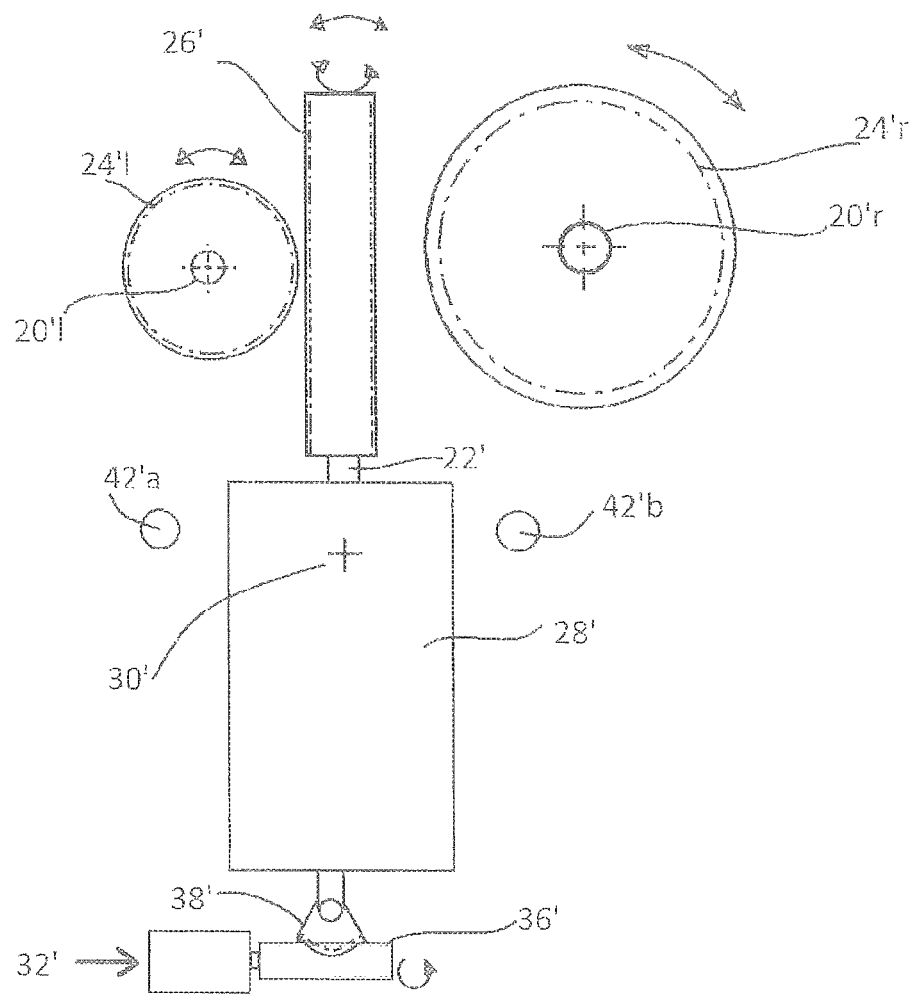
FIG. 6 is a sketch of an alternative embodiment of an electric drive unit on the basis of the embodiment of FIG. 2.

In an alternative embodiment that develops the embodiment of FIG. 1 and of which the significant differences from the embodiment of FIG. 1 are shown in FIG. 6, the worm 26' can protrude above the offset carrier 28' and the transmission shaft 22' can intersect with an axis of rotation 30' of an offset mechanism 32'. A worm wheel segment 38' can be arranged opposite the worm 26'. The offset mechanism 32' can be designed in a manner corresponding to the offset mechanism 32. In an alternative embodiment, the offset carrier 28' can strike a first stop 42'a in the first transmission position and can strike a further stop 42'b in the second transmission position. Striking against the stops 42'a, 42'b and against the stop 42 in the embodiment in FIG. 1 can be used for controlling the offset mechanism 32' and 32, respectively.

It should be noted that the worm wheels 24'l, 24'r can be of different sizes and can therefore have a different number of teeth in order to achieve the desired speed ratio between a rotation of the offset shaft 22' and the output shafts 20'l and 20'r, respectively.

SECOND EMBODIMENT

In the second embodiment of the present invention, a different electric drive unit is installed in the office chair 2 of the first embodiment, a person skilled in the art being able to adapt the force transmission mechanism to the position of the rotary outputs.

In a second embodiment of the present invention, the electric drive unit comprises a change gear 114, a drive input 116 that is designed as a motor shaft, and an electric motor 118 that is connected to the drive input 116. The change gear 114 further comprises two rotary drive outputs that are each designed as an output shaft 120a, 120b, respectively, one of which drives the adjustment device for adjusting a seat height of the seat 4 and the other of which drives the adjustment device for adjusting a tilt of the seat 4 or the backrest 12 in the office chair 2. The change gear 114 comprises a transmission shaft 122 that can coincide here with the motor shaft. The output shafts 120a, 120b are preferably designed so as to be coaxial.

In a particularly simple embodiment, the electric motor 118 can be displaced on a guide (not shown) relative to a base element 148 (for example a rail assembly) in the +/−Z direction by means of a spindle arrangement or similar. As a result, the transmission shaft 122 is offset relative to at least one of the rotary drive outputs by means of a translation substantially along the transmission shaft 122 (in the axial direction of the transmission shaft 122) during a transition between the first transmission position shown in FIG. 3 and the second transmission position.

Half of a claw coupling 144a, 144b, respectively, is preferably arranged at either end of the transmission shaft 112. Respectively associated claw coupling halves 146a, 146b are arranged at corresponding ends of the output shafts 120a, 120b, respectively, said shafts preferably being arranged so as to be fixed, in each case, relative to the displacement mechanism of the electric motor. In the first transmission position of the transmission shaft 122 shown in FIG. 3, the two claw coupling halves 144a, 146a engage in one another and the output shaft 120a is driven. At the same time, the claw coupling halves 144b, 146b are remote from one another to the extent that a coupling between said two coupling halves is not present, such that, in this case, the output shaft 120a is exclusively driven (the coupling 144a, 146a couples and the coupling 144b, 146b is decoupled). In order to reach a second transmission position (not shown), the electric motor 118 is moved in the −Z direction, together with the transmission shaft 122 and the drive-side claw couplings halves 144a, 144b, such that the claw coupling halves 144b, 146b mutually engage, as described above, whereas the claw coupling halves 144a, 146a are at such a distance from one another that no coupling occurs between these elements. Thus, in the second transmission position, the output shaft 120b is exclusively driven.

Figure 3:
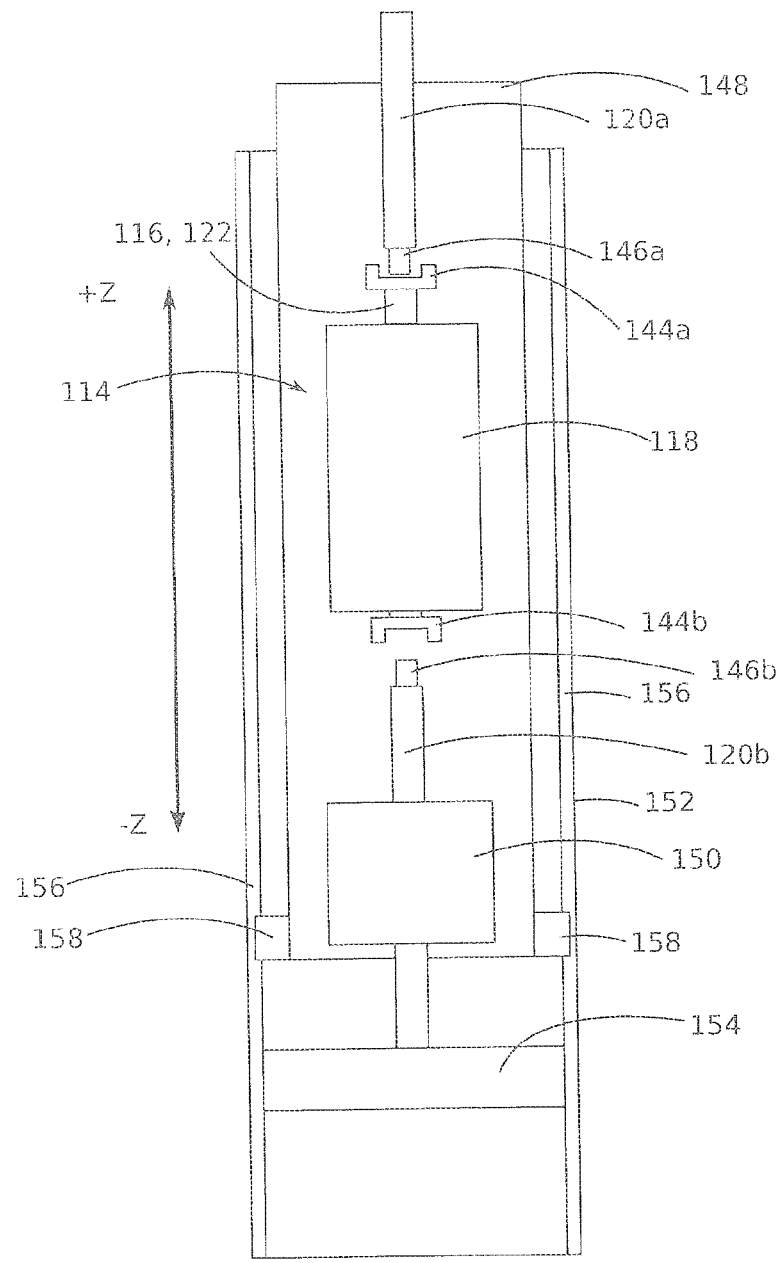
FIG. 3 is a sketch of a further electric drive unit according to an embodiment of the present invention.

As shown in FIG. 3, the base element 148 can be formed as an element of a chair column 6 and the rotary output shaft 120a can extend into the region under the seat surface 4 of the office chair 2. Thus, drive force that is provided can be distributed further, as described in the first embodiment. In particular, the entire electric drive unit can be formed inside the chair column 6, but it is also possible for just the change gear and/or the electric motor to be formed in the chair column 6.

The other rotary output shaft 120b can drive a spindle arrangement by means of a gearing 150. The spindle arrangement can comprise an outer tube 152 that has an internal thread, and an inner slide 154 that has an external thread, the outer tube 152 being prevented from being able to rotate counter to the electric motor 118. This can be achieved for example by means of a connection between slots 156 in the outer tube 152 and slot nuts 158 that can be arranged so as to be substantially fixed relative to the electric motor 118. This arrangement in particular provides a self-locking spindle arrangement.

The invention claimed is:

1. An office chair comprising a base, a seat, a chair column that extends in a vertical direction between the base and the seat, a backrest and an electric drive unit including an electric motor and a change gear, the change gear being designed to input the rotational force of the electric motor into a first adjustment device for adjusting a seat height of the seat and converting said force in a second adjustment device for adjusting a tilt of the seat or the backrest, wherein the change gear comprises a drive input that is connected to the electric motor, and at least two rotary drive outputs, a first rotary drive output driving the first adjustment device and a second rotary drive output driving the second adjustment device.

2. The office chair according to claim 1, wherein the change gear comprises a transmission shaft movable between at least two transmission positions, the transmission shaft coupling the drive input to one of the two rotary drive outputs in a first transmission position, and coupling the drive input to the other of the two rotary drive outputs in a second transmission position.

3. The office chair according to claim 1, wherein the electric drive unit is arranged under a seat surface of the seat of the office chair inside a seat lower shell.

4. The office chair according to claim 1, wherein at least one of the electric motor and the change gear is arranged in the seat column.

5. The office chair according to claim 1, further comprising at least one further adjustment device for adjusting at least one further parameter, selected from: backrest height, seat tilt, backrest tilt, armrest tilt, seat shape and backrest shape.

6. An electric drive unit for use in an office chair comprising:
an electric motor, and
a change gear having a drive input that is connected to the electric motor, and having at least two rotary drive outputs,
wherein
the change gear comprises a transmission shaft that can be moved between at least two transmission positions, the transmission shaft coupling the drive input to one of the two rotary drive outputs in a first transmission position, and coupling the drive input to the other of the two rotary drive outputs in a second transmission position.

7. The electric drive unit according to claim 6, wherein, during a transition between the first transmission position and the second transmission position, the transmission shaft is moved relative to at least one of the rotary drive outputs by means of a pivot movement and/or a translation.

8. The electric drive unit according to claim 6, wherein, during a transition between the first transmission position and the second transmission position, the transmission shaft is moved, at least in portions, substantially in the axial direction of the transmission shaft or in a direction transverse to the axis of the transmission shaft.

9. The electric drive unit according to claim 6, wherein, during a transition between the first transmission position and the second transmission position, the transmission shaft is moved, together with the electric motor, relative to at least one of the rotary drive outputs.

10. The electric drive unit according to claim 6, wherein the transmission shaft forms a motor shaft of the electric motor or is attached coaxially and for conjoint rotation to the motor shaft of the electric motor.

11. The electric drive unit according to claim 6, wherein each of the rotary drive outputs is exclusively driven, in each case, by the electric motor.

12. The electric drive unit according to claim 6, wherein at least two drive shafts of the rotary drive outputs are arranged coaxially.

13. The electric drive unit according to claim 12, wherein the change gear further comprises two couplings which each engage on one end, respectively, of the transmission shaft, wherein the transmission shaft is offset relative to at least one of the rotary drive outputs by means of a translation substantially along the transmission shaft during a transition between the first transmission position and the second transmission position, and wherein one of the couplings is coupled and the other of the couplings is decoupled during this transition.

14. The electric drive unit according to claim 6, wherein at least two drive shafts of the rotary drive outputs are arranged so as to be offset in parallel and/or tilted relative to one another.

15. The electric drive unit according to claim 14, wherein the change gear further comprises a worm arranged on the transmission shaft and at least two worm wheels arranged on the output side, the worm being designed to drive one of the worm wheels in the first transmission position, and to drive another of the worm wheels in the second transmission position.

16. The electric drive unit according to claim 6, further comprising at least one brake mechanism, the brake mechanism blocking a movement of the other worm wheel when one of the worm wheels is driven, in at least one of the first and second transmission positions of the transmission shaft.

* * * * *